United States Patent
Park et al.

(10) Patent No.: US 8,989,312 B2
(45) Date of Patent: Mar. 24, 2015

(54) APPARATUS AND METHOD FOR MMSE CHANNEL ESTIMATION IN CONSIDERATION OF OFFSET COMPENSATION IN WIRELESS COMMUNICATION SYSTEM

(75) Inventors: Si-Hyun Park, Gyeonggi-do (KR);
Yon-Woo Yoon, Gyeonggi-do (KR);
Hwa-Sun You, Seoul (KR); Hee-Won Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/397,257

(22) Filed: Feb. 15, 2012

(65) Prior Publication Data
US 2012/0207254 A1 Aug. 16, 2012

(30) Foreign Application Priority Data
Feb. 15, 2011 (KR) .................. 10-2011-0013156

(51) Int. Cl.
*H03K 9/00* (2006.01)
*H04L 27/00* (2006.01)
*H04L 25/02* (2006.01)
*H04L 27/26* (2006.01)

(52) U.S. Cl.
CPC .......... *H04L 25/022* (2013.01); *H04L 25/0224* (2013.01); *H04L 27/2657* (2013.01); *H04L 27/2662* (2013.01); *H04L 27/2695* (2013.01); *H04L 25/0256* (2013.01)
USPC ........................................................ 375/316

(58) Field of Classification Search
USPC ........................................................ 375/316
See application file for complete search history.

(56) References Cited

U.S. PATENT DOCUMENTS

| | | | |
|---|---|---|---|
| 2006/0128326 A1* | 6/2006 | Pietraski | 455/130 |
| 2008/0108369 A1* | 5/2008 | Visotsky et al. | 455/455 |
| 2009/0154399 A1* | 6/2009 | Yang et al. | 370/328 |
| 2010/0195749 A1* | 8/2010 | Kimura et al. | 375/260 |
| 2010/0272194 A1* | 10/2010 | Zhengang et al. | 375/260 |
| 2010/0296475 A1* | 11/2010 | Visotsky et al. | 370/329 |
| 2010/0316154 A1* | 12/2010 | Park et al. | 375/267 |

FOREIGN PATENT DOCUMENTS

| | | |
|---|---|---|
| JP | 2009-094995 | 4/2009 |
| JP | 2010-506529 | 2/2010 |
| JP | 2012-170070 | 9/2012 |

OTHER PUBLICATIONS

Yoshitaka Eriguchi et al., "2-Dimensional Pilot-Symbol-Assisted (2-D PSA) MMSE Channel Estimation for MIMO-OFDM Systems", IEICE Technical Report, May 19, 2005.

* cited by examiner

*Primary Examiner* — Tanmay Shah
(74) *Attorney, Agent, or Firm* — The Farrell Law Firm, P.C.

(57) ABSTRACT

A channel estimation method of a channel estimation apparatus in a wireless communication system is provided. The method includes predefining a plurality of weight tables about at least one of a speed and a Carrier to Interference-and-Noise Ratio (CINR) using a correlation value considering offset compensation; selecting a weight table to be used for channel estimation based on at least one of the estimated speed and the CINR, from the plurality of weight tables; and multiplying a pilot channel estimation value and the selected weight table, and performing data channel estimation.

22 Claims, 8 Drawing Sheets

APPARATUS AND METHOD FOR MMSE CHANNEL ESTIMATION IN CONSIDERATION OF OFFSET COMPENSATION IN WIRELESS COMMUNICATION SYSTEM

PRIORITY

This application claims priority under 35 U.S.C. §119(a) to a patent application filed in the Korean Intellectual Property Office on Feb. 15, 2011 and assigned Serial No. 10-2011-0013156, the entire disclosure of which is incorporated herein by reference.

BACKGROUND OF THE INVENTION

1. Field of the Invention

The present invention relates to a wireless communication system, and more particularly, to an apparatus and method for Minimum Mean Square Error (MMSE) channel estimation that considers offset compensation in the wireless communication system.

2. Description of the Related Art

In the $4^{th}$ Generation (4G) communication system, research is being conducted to provide users with services of various Qualities of Service (QoS) at a data rate of about 100 Megabits per second (Mbps). The typical 4 G communication system is an Institute of Electrical and Electronics Engineers (IEEE) 802.16 system. The IEEE 802.16 system employs an Orthogonal Frequency Division Multiplexing/Orthogonal Frequency Division Multiple Access (OFDM/OFDMA) scheme in order to support a broadband transmission network in a physical channel.

An OFDM scheme is a scheme of transmitting data using a multi-carrier. That is, the OFDM scheme is a type of Multi Carrier Modulation (MCM) scheme of converting serial input symbol sequences into parallel symbol sequences, modulating each of the symbol sequences into a plurality of subcarriers having mutual orthogonality, i.e., a plurality of sub-channels, and transmitting the modulated subcarriers.

The OFDM scheme based on multi-carrier transmission is advantageous as compared to other systems in estimating a channel having a multipath fading characteristic, because data signals are represented in a 2-dimensional structure of a symbol axis and a subcarrier axis and pilot signals also are transmitted in this structure. The number of assignable pilots is restricted according to the system requirements because, when a pilot signal is a bigger part of a signal, the channel estimation performance can be better, however, the transfer rate of a data signal is worse, relatively. After an OFDM system first estimates a channel of a pilot signal, the OFDM system estimates a channel of a data signal using a channel estimation value of the pilot signal. An example of a pilot signal channel estimation scheme is a Least Square (LS) scheme. Examples of data signal channel estimation schemes are linear interpolation, Low-Pass Filter (LPF), MMSE schemes and the like.

The linear interpolation scheme of estimating a channel between a Base Station (BS) and a Mobile Station (MS) is advantageous in that implementation is not overly complex, but is disadvantageous in that estimation performance for a channel having a multipath fading characteristic is degraded due to frequency selectivity and time variance.

On the other hand, the MMSE scheme has excellent estimation performance for a channel having a multipath fading characteristic. The MMSE scheme is known as a channel estimation scheme having good linear channel estimation performance. The MMSE scheme is a scheme of, after estimating a channel for a pilot tone in a Least Square (LS) technique, performing operation of auto-correlation between pilot tones and cross-correlation between a data tone and the pilot tone, and estimating a channel for the data tone as in Equation (1) below.

$$\hat{h}_d = R_{dp}\left(R_{PP} + \frac{1}{CINR_P}I\right)^{-1} \hat{h}_P^{LS} \quad (1)$$

In Equation (1), "$\hat{h}_d$" represents a data channel estimation value, "$R_{dp}$" represents a cross-correlation value between a data tone and a pilot tone, and "$R_{PP}$" represents an auto-correlation value between pilot tones. The "CINR" represents an estimated Carrier to Interference-and-Noise Ratio (CINR), and "$\hat{h}_P^{LS}$" represents a pilot LS estimation value. Here, it is widely known that, on the general assumption that a complex gain of each path has independent identical distribution (i.d.d.) and has the same time-varying characteristic, a correlation function (R) can have a separation property of a form of Equation (2) below.

$$R(\text{correlation matrix}) = R_f \times R_t = \sum_n (\sigma_n^2 \cdot e^{-j2\pi k \Delta f \tau_n}) \cdot J_0(2\pi \cdot l \cdot T_s \cdot f_D) \quad (2)$$

In Equation (2), the "$R_f$" represents a frequency correlation value, and the "$R_t$" represents a time correlation value. "n" represents the number of paths, and "$\sigma_n^2$" represents an average power of an Nth multipath component. "k" represents relative subcarrier spacing, and the "l" represents relative symbol spacing. "$\Delta f$" represents subcarrier spacing, and "$\tau_n$" represents a delay time of the Nth multipath component. "$J_0$" represents a 0th Bessel function or a function performing function similar to this, and $T_s$" represents a symbol period, and "$f_D$" represents maximum Doppler.

As above, the MMSE scheme has a characteristic in which the number of operations necessary for estimating a channel is considerably large compared to other schemes because of the operation of auto-correlation between pilot tones and cross-correlation between a data tone and a pilot tone and the like. Moreover, the MMSE scheme has a problem in that it is difficult to apply in a real system because of the need for prior knowledge of a power delay profile of a channel, a CINR, a speed and the like. Also, because the existing MMSE scheme does not consider frequency offset and time offset compensation of removing a phase bias element in a subcarrier/symbol direction, the MMSE scheme has a problem in that channel estimation errors caused by frequency selectivity and the Doppler effect are accumulated.

SUMMARY OF THE INVENTION

An aspect of the present invention is to substantially solve at least the above problems and/or disadvantages and to provide at least the advantages below. Accordingly, one aspect of the present invention is to provide an improved Minimum Mean Square Error (MMSE) channel estimation apparatus and method considering offset (i.e., frequency offset and time offset) compensation in a wireless communication system.

Another aspect of the present invention is to provide an improved MMSE channel estimation apparatus and method for improving a large operational complexity of an existing MMSE channel estimation scheme and simultaneously, considering offset (i.e., frequency offset and time offset) compensation and having good performance compared to a conventional linear interpolation channel estimation scheme in an IEEE 802.16m system.

The above aspects are achieved by providing an MMSE channel estimation apparatus and method considering offset compensation in a wireless communication system.

According to one aspect of the present invention, A channel estimation method of a channel estimation apparatus in a wireless communication system is provided. The method includes predefining a plurality of weight tables about at least one of a speed and a Carrier to Interference-and-Noise Ratio (CINR) using a correlation value considering offset compensation; selecting a weight table to be used for channel estimation based on at least one of the estimated speed and the CINR, from the plurality of weight tables; and multiplying a pilot channel estimation value and the selected weight table, and performing data channel estimation.

According to another aspect of the present invention, a channel estimation apparatus in a wireless communication system is provided. The apparatus includes a a weight table generator for predefining a plurality of weight tables quantized about at least one of a speed and a Carrier to Interference-and-Noise Ratio (CINR) using a correlation value considering offset compensation; a weight table selector for selecting a weight table to be used for channel estimation based on at least one of the estimated speed and the CINR, from the plurality of weight tables; and a data channel estimator for multiplying a pilot channel estimation value and the selected weight table, and performing data channel estimation.

BRIEF DESCRIPTION OF THE DRAWINGS

The above and other aspects, objects, features and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described herein below with reference to the accompanying drawings.

In the following description, well-known functions or constructions are not described in detail since they would obscure the invention in unnecessary detail. And terms described below, which are defined considering functions in the present invention, can be different depending on the user and operator's intention or practice. Therefore, the terms should be interpreted on the basis of the disclosure throughout this specification.

An improved way for Minimum Mean Square Error (MMSE) channel estimation considering offset (i.e., frequency offset and time offset) compensation in a wireless communication system according to an embodiment of the present invention is described below.

Below, the present invention is, for example, described with reference to an Institute of Electrical and Electronics Engineers (IEEE) 802.16m system, but is applicable to all wireless communication systems capable of applying MMSE channel estimation. In the following description, a channel estimation apparatus can be included in a terminal or Base Station (BS) and can be included in other devices requiring channel estimation.

A conventional MMSE channel estimation technology requires a complex operation process as in Equation 1 above. To address the problem of the large number of operations as shown in Equation 1 above, for example, the present invention pre-defines a table $$R_{dp}\left(R_{PP} + \frac{1}{CINR_R}I\right)^{-1}$$

that is a weight of a pilot LS estimation value "$\hat{h}_p^{LS}$", and thus decrease a complexity of operation of MMSE channel estimation. In particular, the present invention provides a way for quantizing a speed and a Carrier to Interference-and-Noise Ratio (CINR) to predefine weight tables ($W_k$) of "k" number, and selecting a weight table according to the estimation speed and CINR. Thus, embodiments of the present invention can decrease the operational complexity, while simultaneously minimizing a loss resulting from the weight table quantization.

Also, the conventional MMSE channel estimation requires a prior knowledge of a power delay profile of a channel, a CINR, a speed and the like as in Equation (2) above, and it is difficult to apply such exact prior knowledge of a real environment. To solve this, the present invention provides a way for predefining a channel profile so that it becomes a robust channel estimation apparatus capable of considering several realistic channel models and minimizing modeling error. Moreover, the present invention provides a way for considering frequency offset and time offset compensation and minimizing a channel estimation error caused by frequency selectivity and the Doppler effect through a process of removing a phase bias component from a weight table of MMSE channel estimation.

Figure 1:
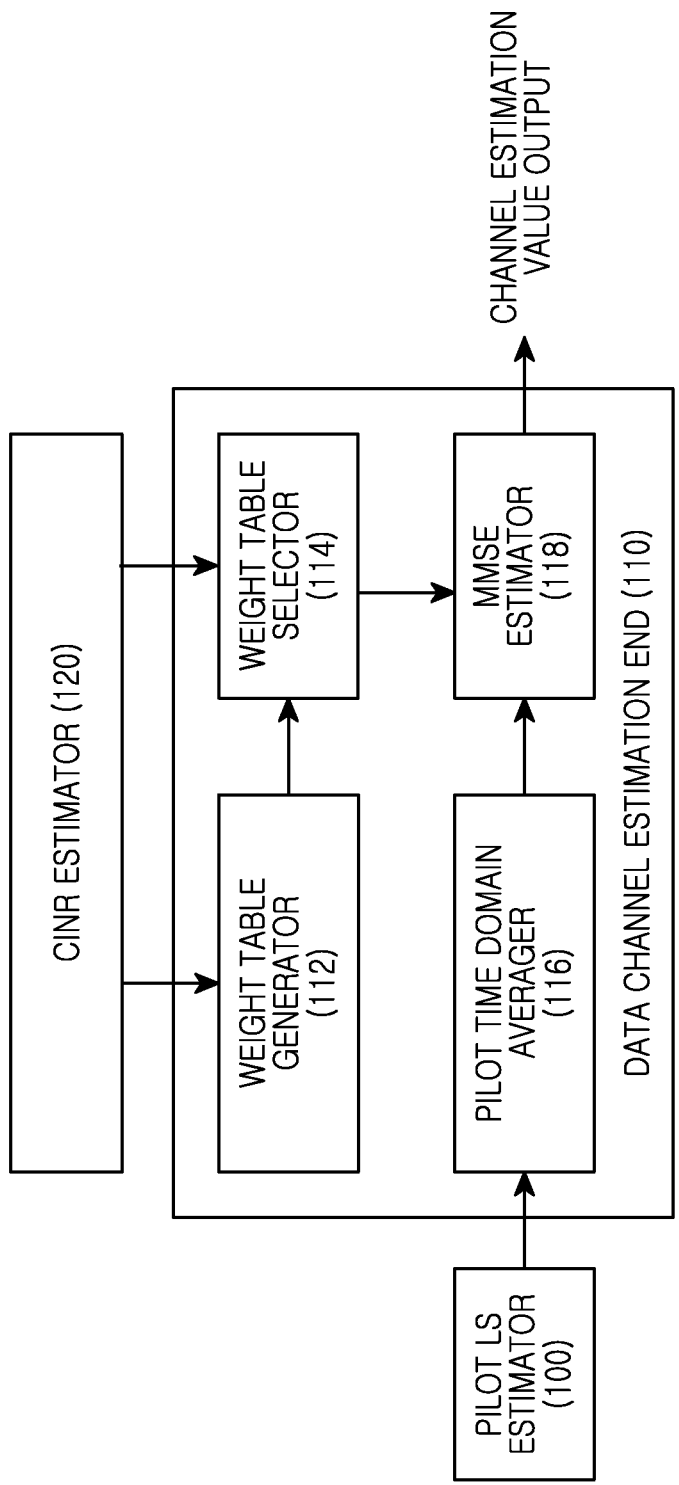
FIG. 1 is a block diagram illustrating a channel estimation apparatus of a wireless communication system according to an embodiment of the present invention.

FIG. 1 is a block diagram illustrating a channel estimation apparatus of a wireless communication system according to an embodiment of the present invention.

As illustrated, the channel estimation apparatus includes a pilot Least Square (LS) estimator 100, a data channel estimation end 110, and a Carrier to Interference-and-Noise Ratio (CINR) estimator 120. The data channel estimation end 110 includes a weight table generator 112, a weight table selector 114, a pilot time domain averager 116, and an MMSE estimator 118.

Referring to FIG. 1, the pilot LS estimator 100 performs pilot channel estimation in an LS scheme and estimates a pilot LS estimation value.

The weight table generator 112 predefines a plurality of weight tables a CINR using a correlation value considering offset (i.e., frequency offset and time offset) compensation.

The weight table selector 114 selects one weight table to be used for MMSE channel estimation based on an estimated CINR, among the plurality of weight tables predefined considering the offset (i.e., frequency offset and time offset) compensation.

To reduce the number of operations, the pilot time domain averager 116 averages the determined pilot LS estimation value on a time domain and determines a pilot LS average value. For instance, if averaging LS estimation values of pilot tones of the same subcarrier in an IEEE 16m uplink, three pilot LS average values are determined in the case of a CLRU 1 & 2 Transmit (Tx) stream, four pilot LS average values are determined in the case of a CLRU 3 & 4 Tx stream, and two pilot LS average values are determined in the case of a DLRU 1 & 2 Tx stream.

The MMSE estimator 118 multiplies the determined pilot LS average value and the selected weight table, performs data channel estimation in an MMSE scheme, and determines a data channel estimation value.

The CINR estimator 120 estimates a CINR and determines the estimated CINR.

Figure 2:
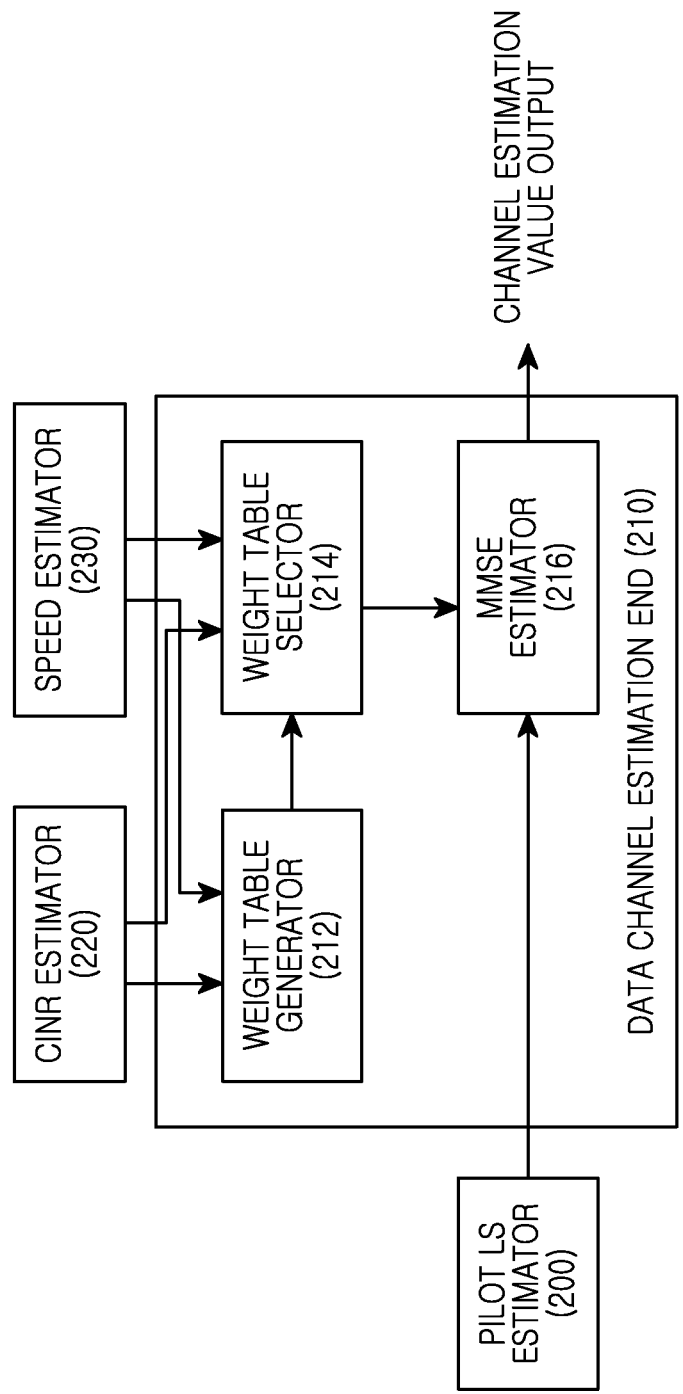
FIG. 2 is a block diagram illustrating a channel estimation apparatus of a wireless communication system according to another embodiment of the present invention.

FIG. 2 is a block diagram illustrating a channel estimation apparatus of a wireless communication system according to another embodiment of the present invention.

As illustrated, the channel estimation apparatus includes a pilot LS estimator 200, a data channel estimation end 210, a CINR estimator 220, and a speed estimator 230. The data channel estimation end 210 includes a weight table generator 212, a weight table selector 214, and an MMSE estimator 216.

Referring to FIG. 2, the pilot LS estimator 200 performs pilot channel estimation in an LS scheme and determines a pilot LS estimation value.

The weight table generator 212 predefines a plurality of weight tables quantized about a speed and a CINR using a correlation value considering offset (i.e., frequency offset and time offset) compensation.

The weight table selector 214 selects one weight table to be used for MMSE channel estimation based on an estimated speed and CINR, among the plurality of weight tables predefined considering the offset (i.e., frequency offset and time offset) compensation.

The MMSE estimator 216 multiplies the determined pilot LS estimation value and the selected weight table, performs data channel estimation in an MMSE scheme, and determines a data channel estimation value.

The CINR estimator 220 estimates a CINR and determines the estimated CINR.

The speed estimator 230 estimates a speed and determines the estimated speed. Here, the speed can be estimated through a Level Crossing Rate (LCR) scheme or a Correlation Based (CB) scheme. The LCR scheme is a scheme of estimating a speed according to the number of times of passing through a reference point on the basis of a Channel Quality Information (CQI) or channel estimation. The CB scheme is a scheme of estimating a speed according to correlation between pilots.

Figure 3:
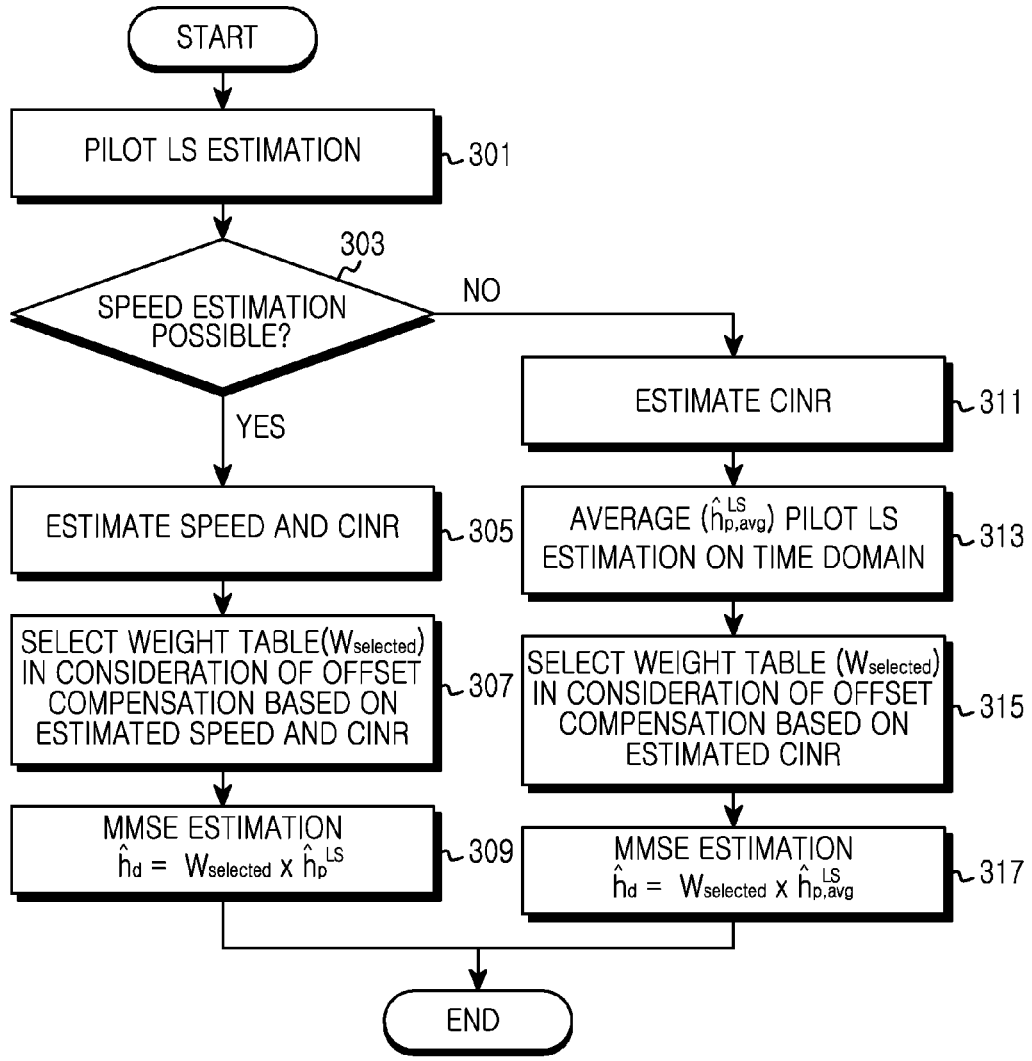
FIG. 3 is a flowchart illustrating a Minimum Mean Square Error (MMSE) channel estimation method considering offset compensation in a channel estimation apparatus of a wireless communication system according to an embodiment of the present invention.

FIG. 3 is a flowchart illustrating an MMSE channel estimation method considering offset compensation in a channel estimation apparatus of a wireless communication system according to an embodiment of the present invention.

Referring to FIG. 3, in step 301, the channel estimation apparatus performs pilot channel estimation in an LS scheme and determines a pilot LS estimation value. Assuming that pilot tones of "$N_p$" number exist per each stream and a position of a pilot tone is $\{[l_1^p, k_1^p], \ldots, [l_{N_p}^p, k_{N_p}^p]\}$ in an IEEE 802.16m system, the pilot LS estimation value "$\hat{h}_p^{LS}[l_i^p, k_i^p]$" can be expressed as in Equation (3) below. The 'l' represents relative symbol spacing, and "k" represents relative subcarrier spacing.

$$\hat{h}_p^{LS}[l_i^p, k_i^p] = \frac{Y[l_i^p, k_i^p]}{\mu X[l_i^p, k_i^p]} \tag{3}$$

In Equation (3), "$X[l_i^p, k_i^p]$" represents a transmit signal deployed in a pilot tone, and "$Y[l_i^p, k_i^p]$" represents a receive signal in a pilot tone, and "u" represents a pilot boosting value.

In step 303, the channel estimation apparatus then determines if speed estimation is possible. If speed estimation is impossible, the channel estimation apparatus assumes that there is no speed difference between symbols, and determines LS estimation values of pilot tones of the same subcarrier as the same value. Accordingly, by averaging the LS estimation values of the pilot tones of the same subcarrier, the channel estimation apparatus can reduce the number of operations.

If it is determined in step 303 that speed estimation is possible, in step 305, the channel estimation apparatus estimates a speed and a CINR, and proceeds to step 307.

In step 307, the channel estimation apparatus then selects one weight table ($W_{selected}$) to be used for MMSE channel estimation based on the estimated speed and CINR, among a plurality of weight tables predefined considering offset (i.e., frequency offset and time offset) compensation. To accomplish the above, the channel estimation apparatus predefines weight tables of "k" number quantized about the speed and the CINR using a correlation value considering the frequency offset and time offset compensation. A weight table definition method will described in detail with reference to FIG. 4.

In step 309, the channel estimation apparatus multiplies the determined pilot LS estimation value and the selected weight table ($W_{selected}$), performs data channel estimation in an MMSE scheme, and determines a data channel estimation value. That is, the channel estimation apparatus determines the data channel estimation value as in Equation (4) below.

$$\hat{h}_d = W_{selected} \times \hat{h}_p^{LS} \tag{4}$$

In Equation (4),"$\hat{h}_d$: represents a data channel estimation value, "$W_{selected}$" represents a selected weight table, and "$\hat{h}_p^{LS}$" represents a pilot LS estimation value.

However, when it is determined in step 303 that the speed estimation is impossible, in step 311, the channel estimation apparatus estimates only a CINR without estimating a speed and then, proceeds to step 313.

In step 313, in order to reduce the number of operations, the channel estimation apparatus averages the determined pilot LS estimation value on a time domain and determines a pilot LS average value. That is, the channel estimation apparatus averages LS estimation values of pilot tones of the same subcarrier and determines the pilot LS average value "$\hat{h}_{p,avg}^{LS}$" as in Equation (5) below. If speed estimation is impossible as above, the channel estimation apparatus can reduce the number of operations by assuming a static channel and averaging the LS estimation values of the pilot tones of the same subcarrier.

$$\hat{h}_{p,avg}^{LS}(i) = \frac{1}{2} \left( \hat{h}_p^{LS} [l_{2i-1}^p, k_{2i-1}^p] + \hat{h}_p^{LS} [l_{2i}^p, k_{2i}^p] \right), \quad (5)$$

$$\text{wherein } i = 1, \ldots, \frac{N_p}{2}$$

Figure 5:
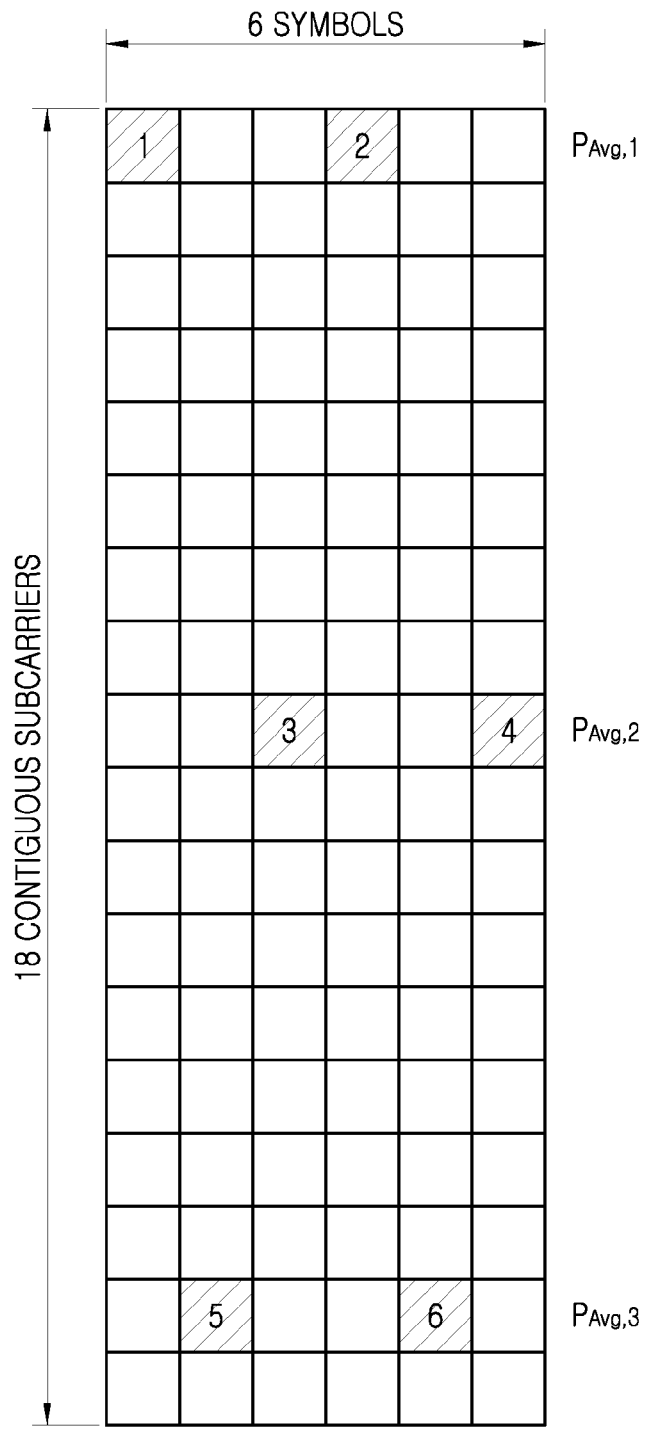
FIG. 5 is a diagram illustrating one example of a pilot pattern.

For instance, if averaging LS estimation values of pilot tones of the same subcarrier in a IEEE 16m uplink, three pilot LS average values are determined in the case of a CLRU 1 & 2 Transmit (Tx) stream, four pilot LS average values are determined in the case of a CLRU 3 & 4 Tx stream, and two pilot LS average values are determined in the case of a DLRU 1 & 2 Tx stream. FIG. 5 illustrates an example of a pilot pattern of a CLRU 1 Tx stream. It can be identified that three pilot LS average values are determined.

In step 315, the channel estimation apparatus selects one weight table ($W_{selected}$) to be used for MMSE channel estimation based on the estimated CINR, among a plurality of weight tables predefined considering offset (i.e., frequency offset and time offset) compensation. To accomplish this, the channel estimation apparatus predefines weight tables of "k" number quantized about the CINR using a correlation value considering the frequency offset and time offset compensation. A weight table definition method is described in detail with reference to FIG. 4.

In step 317, the channel estimation apparatus multiplies the determined pilot LS average value and the selected weight table ($W_{selected}$), performs data channel estimation in an MMSE scheme, and determines a data channel estimation value. That is, the channel estimation apparatus determines the data channel estimation value as in Equation (6) below.

$$\hat{h}_d = W_{selected} \times \hat{h}_{p,avg}^{LS} \quad (6)$$

In Equation (6), "$\hat{h}_d$" represents a data channel estimation value, "$W_{selected}$" represents a selected weight table, and "$\hat{h}_{p,avg}^{LS}$" represents a pilot LS average value.

the channel estimation apparatus then terminates the algorithm according to the embodiment of the present invention.

Figure 4A:
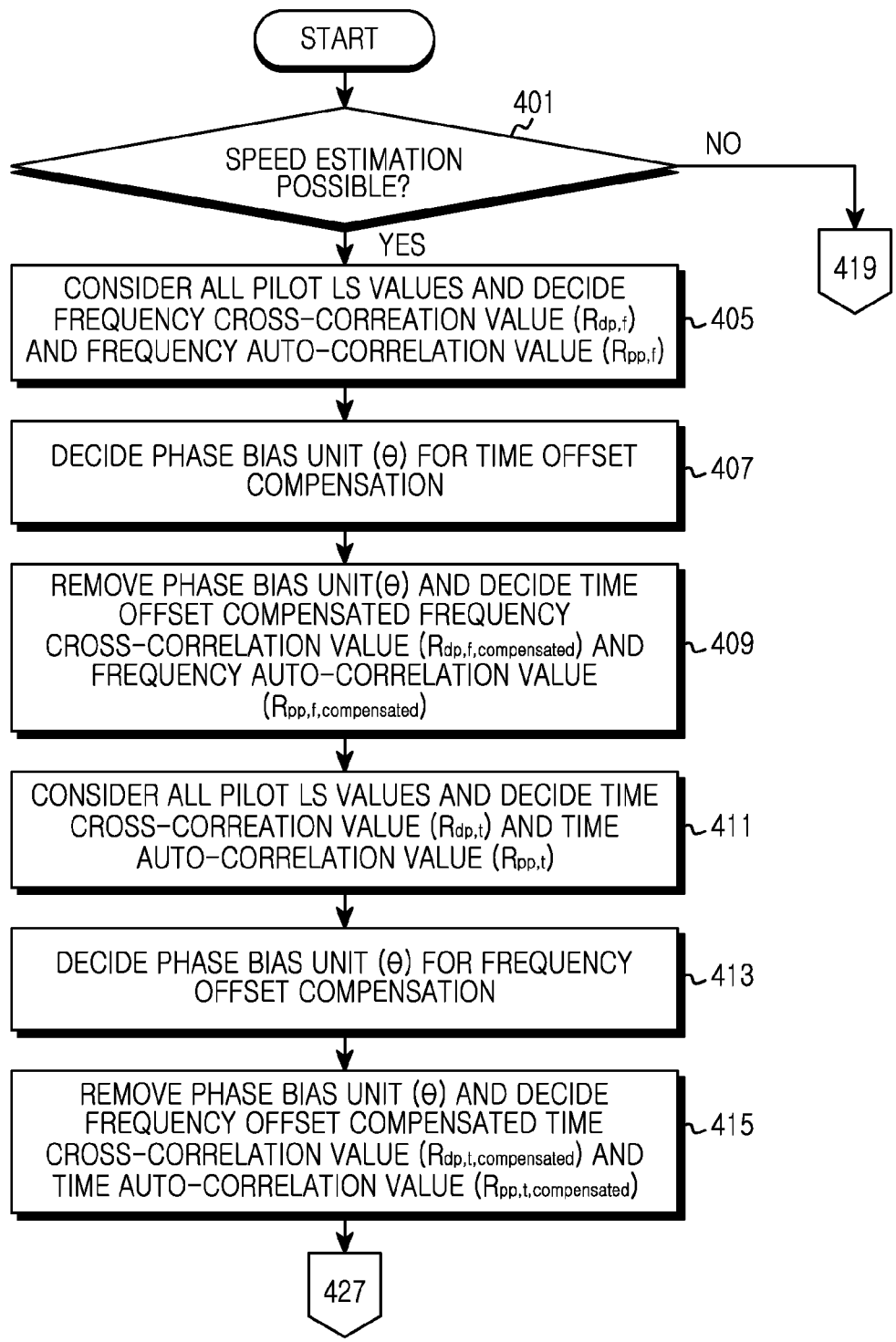
FIG. 4 is a flowchart illustrating a weight table definition method for MMSE channel estimation considering offset compensation in a channel estimation apparatus of a wireless communication system according to an embodiment of the present invention.
Figure 4B:
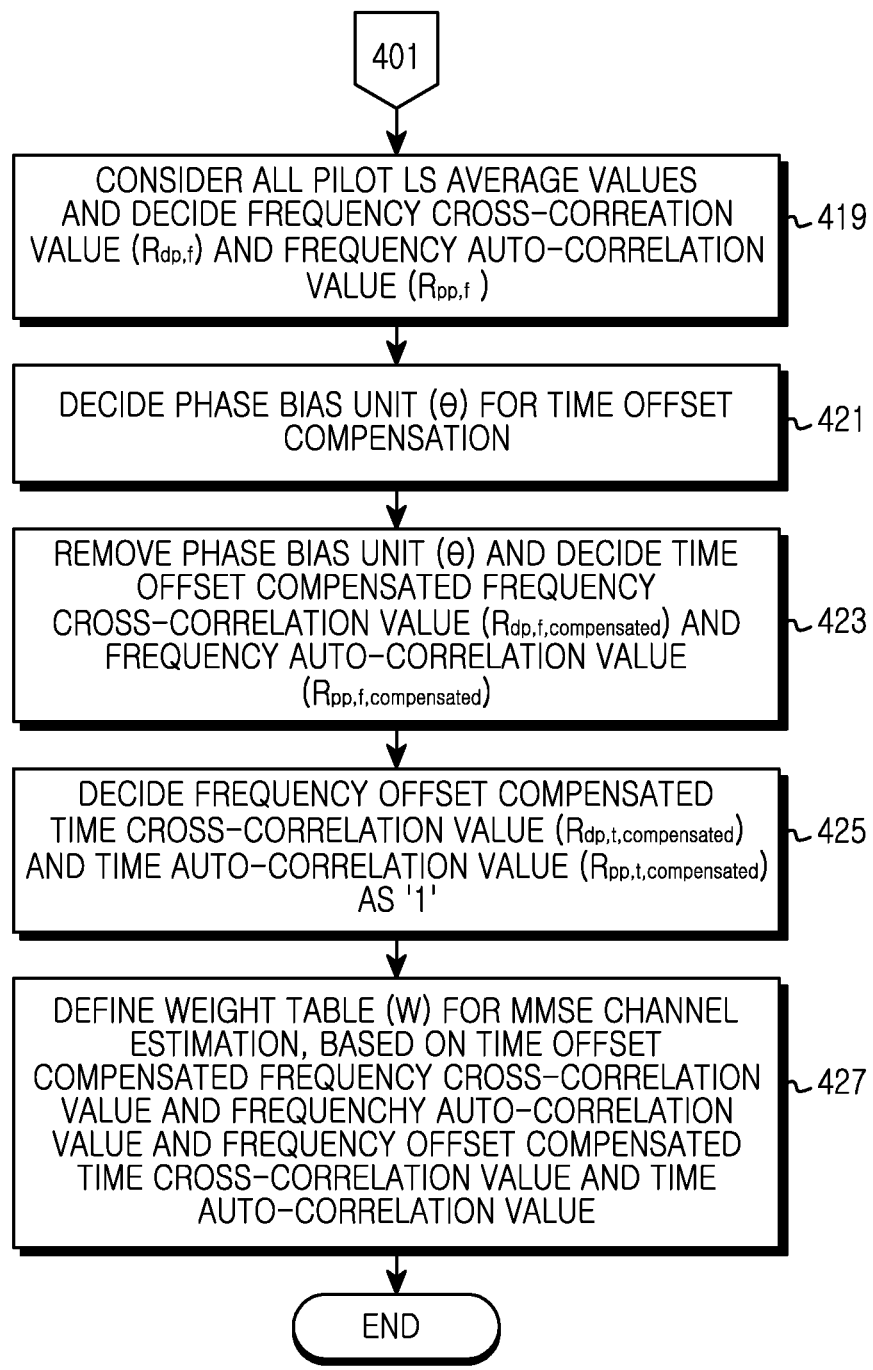

FIG. 4 is a flowchart illustrating a weight table definition method for MMSE channel estimation considering offset compensation in a channel estimation apparatus of a wireless communication system according to an embodiment of the present invention.

Figure 6:
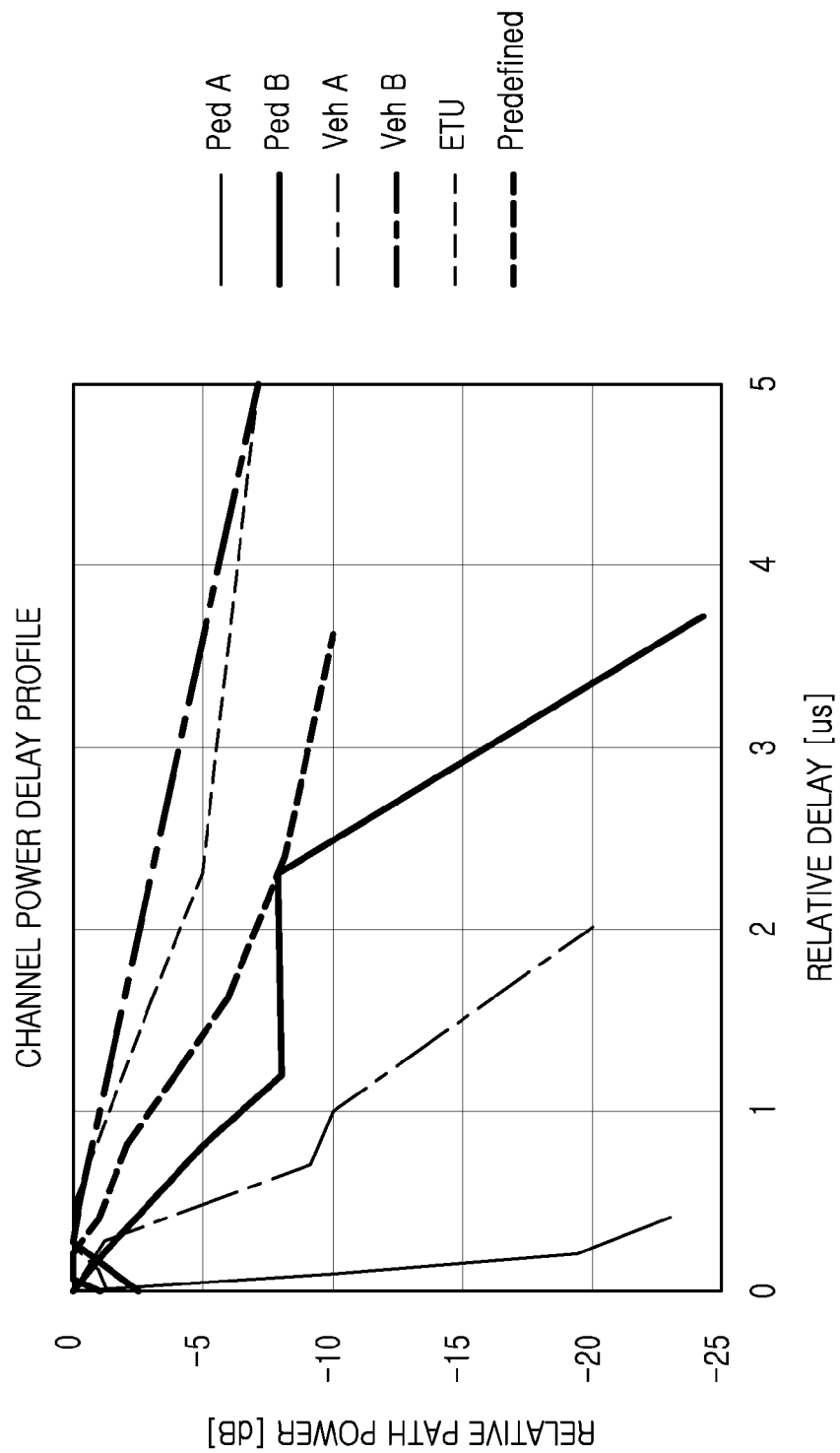
FIG. 6 is a graph illustrating a power delay profile by channel model between the present invention and the related art.

Prior to this, a channel estimation apparatus predefines a channel profile so that the apparatus can consider several realistic channel models and minimize modeling error. Here, FIG. 6 illustrates a comparison of a Power Delay Profile (PDP) by channel model. The channel profile can be predefined as a pattern deforming an International Telecommunication Union (ITU) Pedestrian B channel so that performance degradation is minimized even for an ETU channel.

Referring to FIG. 4, in step 401, the channel estimation apparatus determines if speed estimation is possible. If it is determined that speed estimation is impossible, the channel estimation apparatus assumes that there is no speed difference between symbols, and determines LS estimation values of pilot tones of the same subcarrier as the same value. Accordingly, by averaging the LS estimation value of the pilot tones of the same subcarrier, and considering pilot LS average values and determining a frequency cross-correlation value "$R_{dp,f}$" and a frequency auto-correlation value "$R_{pp,f}$", the channel estimation apparatus can reduce the number of operations. However, if it is determined that the speed estimation is possible, assuming that there is a speed difference between symbols, the channel estimation apparatus considers all pilot LS values and determine a frequency cross-correlation value "$R_{dp,f}$" and a frequency auto-correlation value "$R_{pp,f}$", and a time cross-correlation value "$R_{dp,t}$" and a time auto-correlation value "$R_{pp,t}$".

If it is determined in step 401 that the speed estimation is possible, the channel estimation apparatus can determine time offset compensated frequency correlation values for a case in which the speed estimation is possible in steps 405 to 409, and can determine frequency offset compensated time correlation values for a case in which speed estimation is possible through steps 411 to 415. However, if it is determined in step 401 that speed estimation is impossible, the channel estimation apparatus can determine time offset compensated frequency correlation values for a case in which the speed estimation is impossible in steps 419 to 423, and can determine frequency offset compensated time correlation values for a case that the speed estimation is impossible through step 425. The following description discloses determining the frequency offset compensated time correlation values after determining the time offset compensated frequency correlation values, however, it is possible to perform in inverse order or in parallel.

Specifically, when it is determined in step 401 that the speed estimation is possible, in step 405, the channel estimation apparatus considers all pilot LS values and determines a frequency cross-correlation value "$R_{dp,f}$" and a frequency auto-correlation value "$R_{pp,f}$". For example, in the case in which speed estimation is possible in an IEEE 16m uplink pilot pattern of a 1 Tx stream of FIG. 5, the channel estimation apparatus can determine a frequency cross-correlation value "$R_{dp,f}$" and a frequency auto-correlation value "$R_{pp,f}$" considering all pilot LS values, as in Equations (7) and (8) below.

$$R_{dp,f} = \begin{bmatrix} P_1 & P_2 & P_3 & P_4 & P_5 & P_6 \\ R_0 & R_0 & R_8^* & R_8^* & R_{16}^* & R_{16}^* \\ \vdots & \vdots & \vdots & \vdots & \vdots & \vdots \\ R_8 & R_8 & R_0 & R_0 & R_8^* & R_8^* \\ \vdots & \vdots & \vdots & \vdots & \vdots & \vdots \\ R_{16} & R_{16} & R_8 & R_8 & R_0 & R_0 \\ R_{17} & R_{17} & R_9 & R_9 & R_1 & R_1 \end{bmatrix}, \quad (7)$$

$$\text{wherein } R_k = \sum_n (\sigma_n^2 \cdot e^{-j2\pi k \Delta f \tau_n})$$

$$R_{pp,f} = \begin{bmatrix} P_1 & P_2 & P_3 & P_4 & P_5 & P_6 \\ R_0 & R_0 & R_8^* & R_8^* & R_{16}^* & R_{16}^* \\ R_0 & R_0 & R_8^* & R_8^* & R_{16}^* & R_{16}^* \\ R_8 & R_8 & R_0 & R_0 & R_8^* & R_8^* \\ R_8 & R_8 & R_0 & R_0 & R_8^* & R_8^* \\ R_{16} & R_{16} & R_8 & R_8 & R_0 & R_0 \\ R_{16} & R_{16} & R_8 & R_8 & R_0 & R_0 \end{bmatrix} \quad (8)$$

Here, a frequency correlation value "$R_f$" can be determined through $$\sum_n (\sigma_n^2 \cdot e^{-j2\pi k \Delta f \tau_n}).$$

The required parameters (i.e., $\sigma_n^2$, $\tau_n$) use the predefined channel profile. Equation (7) represents frequency cross-correlation values with eighteen subcarrier tones regarding each of the pilot LS values ($P_1$, $P_3$, $P_3$, $P_4$, $P_5$, $P_6$), and Equation (8) represents frequency auto-correlation values with six pilot tones regarding each of the pilot LS values ($P_1$, $P_2$, $P_3$, $P_4$, $P_5$, $P_6$).

Then, in step 407, the channel estimation apparatus determines a phase bias unit (θ) for time offset compensation. For instance, in the case in which speed estimation is possible in an IEEE 16m uplink pilot pattern of a 1 Tx stream, a phase bias unit (θ) for time offset compensation can be determined as in Equation (9) below.

$$R_8 = a + bi, \text{ phase bias } (\theta) = \frac{\tan^{-1}\left(\frac{b}{a}\right)}{8} \quad (9)$$

Specifically, in the case in which a correlation value ($R_8$) of a case that eight subcarrier tones exist between two pilots is defined as a general expression of a+bi, a phase bias unit (θ) for time offset compensation can be determined as a changed phase of one subcarrier tone by dividing a changed phase between the eight subcarrier tones by "8".

In step 409, the channel estimation apparatus then removes the determined phase bias unit (θ) from the determined frequency cross-correlation value "$R_{dp,f}$" and frequency auto-correlation value "$R_{pp,f}$", and determines a time offset compensated frequency cross-correlation value "$R_{dp,f,compensated}$" and frequency auto-correlation value "$R_{pp,f,compensated}$". For example, if the determined phase bias unit (θ) of Equation (9) above is removed from the determined frequency cross-correlation value "$R_{dp,f}$" and frequency auto-correlation value "$R_{pp,f}$" of Equations (7) and (8) above, a time offset compensated frequency cross-correlation value "$R_{dp,f,compensated}$" and frequency auto-correlation value "$R_{pp,f,compensated}$" can be determined as in Equations (10) and (11) below.

$$R_{dp,f,compensated} = \begin{bmatrix} R_0 \cdot e^{-j2\pi\theta \times 0} & R_0 \cdot e^{-j2\pi\theta \times 0} & (R_8 \cdot e^{-j2\pi\theta \times 8}) & (R_8 \cdot e^{-j2\pi\theta \times 8})^* & (R_{16} \cdot e^{-j2\pi\theta \times 16})^* & (R_{16} \cdot e^{-j2\pi\theta \times 16})^* \\ \vdots & \vdots & \vdots & \vdots & \vdots & \vdots \\ R_8 \cdot e^{-j2\pi\theta \times 8} & R_8 \cdot e^{-j2\pi\theta \times 8} & R_0 \cdot e^{-j2\pi\theta \times 0} & R_0 \cdot e^{-j2\pi\theta \times 0} & (R_8 \cdot e^{-j2\pi\theta \times 8})^* & (R_8 \cdot e^{-j2\pi\theta \times 8})^* \\ \vdots & \vdots & \vdots & \vdots & \vdots & \vdots \\ R_{16} \cdot e^{-j2\pi\theta \times 16} & R_{16} \cdot e^{-j2\pi\theta \times 16} & R_8 \cdot e^{-j2\pi\theta \times 8} & R_8 \cdot e^{-j2\pi\theta \times 8} & R_0 \cdot e^{-j2\pi\theta \times 0} & R_0 \cdot e^{-j2\pi\theta \times 0} \\ R_{17} \cdot e^{-j2\pi\theta \times 17} & R_{17} \cdot e^{-j2\pi\theta \times 17} & R_9 \cdot e^{-j2\pi\theta \times 9} & R_9 \cdot e^{-j2\pi\theta \times 9} & R_1 \cdot e^{-j2\pi\theta \times 1} & R_1 \cdot e^{-j2\pi\theta \times 1} \end{bmatrix} \quad (10)$$

$$R_{pp,f,compensated} = \begin{bmatrix} R_0 \cdot e^{-j2\pi\theta \times 0} & R_0 \cdot e^{-j2\pi\theta \times 0} & (R_8 \cdot e^{-j2\pi\theta \times 8})^* & (R_8 \cdot e^{-j2\pi\theta \times 8})^* & (R_{16} \cdot e^{-j2\pi\theta \times 16})^* & (R_{16} \cdot e^{-j2\pi\theta \times 16})^* \\ R_0 \cdot e^{-j2\pi\theta \times 0} & R_0 \cdot e^{-j2\pi\theta \times 0} & (R_8 \cdot e^{-j2\pi\theta \times 8})^* & (R_8 \cdot e^{-j2\pi\theta \times 8})^* & (R_{16} \cdot e^{-j2\pi\theta \times 16})^* & (R_{16} \cdot e^{-j2\pi\theta \times 16})^* \\ R_8 \cdot e^{-j2\pi\theta \times 8} & R_8 \cdot e^{-j2\pi\theta \times 8} & R_0 \cdot e^{-j2\pi\theta \times 0} & R_0 \cdot e^{-j2\pi\theta \times 0} & (R_8 \cdot e^{-j2\pi\theta \times 8})^* & (R_8 \cdot e^{-j2\pi\theta \times 8})^* \\ R_8 \cdot e^{-j2\pi\theta \times 8} & R_8 \cdot e^{-j2\pi\theta \times 8} & R_0 \cdot e^{-j2\pi\theta \times 0} & R_0 \cdot e^{-j2\pi\theta \times 0} & (R_8 \cdot e^{-j2\pi\theta \times 8})^* & (R_8 \cdot e^{-j2\pi\theta \times 8})^* \\ R_{16} \cdot e^{-j2\pi\theta \times 16} & R_{16} \cdot e^{-j2\pi\theta \times 16} & R_8 \cdot e^{-j2\pi\theta \times 8} & R_8 \cdot e^{-j2\pi\theta \times 8} & (R_8 \cdot e^{-j2\pi\theta \times 8})^* & R_8 \cdot e^{-j2\pi\theta \times 0} \\ R_{16} \cdot e^{-j2\pi\theta \times 16} & R_{16} \cdot e^{-j2\pi\theta \times 16} & R_8 \cdot e^{-j2\pi\theta \times 8} & R_8 \cdot e^{-j2\pi\theta \times 8} & R_0 \cdot e^{-j2\pi\theta \times 0} & R_0 \cdot e^{-j2\pi\theta \times 0} \end{bmatrix} \quad (11)$$

In step 411, the channel estimation apparatus determines a time cross-correlation value "$R_{dp,t}$" and a time auto-correlation value "$R_{pp,t}$" considering all the pilot LS values. For example, in the case in which speed estimation is possible in an IEEE 16m uplink pilot pattern of a 1 Tx stream, a time cross-correlation value "$R_{dp,t}$" and a time auto-correlation value "$R_{pp,t}$" considering all pilot LS values can be determined as in Equations (12) and (13) below.

$$R_{dp,t,0} = \begin{bmatrix} P_1 & P_2 & P_3 & P_4 & P_5 & P_6 \\ R_0 & R_3 & R_2 & R_5 & R_1 & R_4 \\ \vdots & \vdots & \vdots & \vdots & \vdots & \vdots \\ R_0 & R_3 & R_2 & R_5 & R_1 & R_4 \end{bmatrix}, \quad (12)$$

wherein $R_l = J_0(2\pi \cdot l \cdot T_s \cdot f_D)$

For a 0th symbol, Equation (12) above determines a time cross-correlation value "$R_{dp,t}$" considering all pilot LS values and, for all symbols, i.e., 0th to 6th symbols of FIG. 5, Equation (12) above can determine a time cross-correlation value "$R_{dp,t}$" considering all pilot LS values in the same method.

$$R_{pp,t} = \begin{bmatrix} P_1 & P_2 & P_3 & P_4 & P_5 & P_6 \\ R_0 & R_{-3} & R_{-2} & R_{-5} & R_{-1} & R_{-4} \\ R_3 & R_0 & R_1 & R_{-2} & R_2 & R_{-1} \\ R_2 & R_{-1} & R_0 & R_{-3} & R_1 & R_{-2} \\ R_5 & R_2 & R_3 & R_0 & R_4 & R_1 \\ R_1 & R_{-2} & R_{-1} & R_{-4} & R_0 & R_{-3} \\ R_4 & R_1 & R_2 & R_{-1} & R_3 & R_0 \end{bmatrix} \quad (13)$$

A time correlation value "$R_l$" can be determined through $J_0(2\pi \cdot l \cdot T_s \cdot f_D)$. Here, a required parameter (i.e., $f_D$) uses the predefined channel profile. Equation (12) above represents time cross-correlation values with eighteen subcarrier tones regarding each of the pilot LS values ($P_1, P_3, P_3, P_4, P_5, P_6$), and Equation (13) above represents time auto-correlation values with six pilot tones regarding each of the pilot LS values ($P_1, P_2, P_3, P_4, P_5, P_6$).

Then, in step 413, the channel estimation apparatus determines a phase bias unit (θ) for frequency offset compensation. For instance, in the case in which speed estimation is possible in an IEEE 16m uplink pilot pattern of a 1 Tx stream, a phase bias unit (θ) for frequency offset compensation can be determined as in Equation (14) below.

$$R_3 = a + bi, \quad \text{phase bias}(\theta) = \frac{\tan^{-1}\left(\frac{b}{a}\right)}{3} \quad (14)$$

Specifically, in the case in which a correlation value ($R_3$) of a case that three symbol tones exist between two pilots is defined as a general expression of a+bi, a phase bias unit (θ) for frequency offset compensation can be determined as a changed phase of one subcarrier tone by dividing a changed phase between the three symbols tones by '3'.

In step 415, the channel estimation apparatus removes the determined phase bias unit (θ) from the determined time cross-correlation value $R_{dp,t}$ and time auto-correlation value "$R_{pp,t}$", and determined a frequency offset compensated time cross-correlation value "$R_{dp,t,compensated}$" and time auto-correlation value "$R_{pp,t,compensated}$". For example, if the determined phase bias unit (θ) of Equation (14) above is removed from the determined time cross-correlation value "$R_{dp,t}$" and time auto-correlation value "$R_{pp,t}$" of Equations (12) and (13) above, a frequency offset compensated time cross-correlation value "$R_{dp,t,compensated}$" and time auto-correlation value "$R_{pp,t,compensated}$" can be determined as in Equations (15) and (16) below.

$$R_{dp,t,0,compensated} = \begin{bmatrix} R_0 \cdot e^{-j2\pi\theta \times 0} & R_3 \cdot e^{-j2\pi\theta \times 3} & R_2 \cdot e^{-j2\pi\theta \times 2} & R_5 \cdot e^{-j2\pi\theta \times 5} & R_1 \cdot e^{-j2\pi\theta \times 1} & R_4 \cdot e^{-j2\pi\theta \times 4} \\ \vdots & \vdots & \vdots & \vdots & \vdots & \vdots \\ R_0 \cdot e^{-j2\pi\theta \times 0} & R_3 \cdot e^{-j2\pi\theta \times 3} & R_2 \cdot e^{-j2\pi\theta \times 2} & R_5 \cdot e^{-j2\pi\theta \times 5} & R_1 \cdot e^{-j2\pi\theta \times 1} & R_4 \cdot e^{-j2\pi\theta \times 4} \end{bmatrix} \quad (15)$$

For a 0th symbol, Equation (15) above determines a frequency offset compensated time cross-correlation value "$R_{dp,t,compensated}$" and, for all symbols, i.e., 0th to 6th symbols of FIG. 5, Equation (15) above can determine a frequency offset compensated time cross-correlation value "$R_{dp,t,compensated}$" in the same method.

$$R_{pp,t,compensated} = \begin{bmatrix} R_0 \cdot e^{-j2\pi\theta \times 0} & R_{-3} \cdot e^{-j2\pi\theta \times (-3)} & R_{-2} \cdot e^{-j2\pi\theta \times (-2)} & R_{-5} \cdot e^{-j2\pi\theta \times (-5)} & R_{-1} \cdot e^{-j2\pi\theta \times (-1)} & R_{-4} \cdot e^{-j2\pi\theta \times (-4)} \\ R_3 \cdot e^{-j2\pi\theta \times 3} & R_0 \cdot e^{-j2\pi\theta \times 0} & R_1 \cdot e^{-j2\pi\theta \times 1} & R_{-2} \cdot e^{-j2\pi\theta \times (-2)} & R_2 \cdot e^{-j2\pi\theta \times 2} & R_{-1} \cdot e^{-j2\pi\theta \times (-1)} \\ R_2 \cdot e^{-j2\pi\theta \times 2} & R_{-1} \cdot e^{-j2\pi\theta \times (-1)} & R_0 \cdot e^{-j2\pi\theta \times 0} & R_{-3} \cdot e^{-j2\pi\theta \times (-3)} & R_1 \cdot e^{-j2\pi\theta \times 1} & R_{-2} \cdot e^{-j2\pi\theta \times (-2)} \\ R_5 \cdot e^{-j2\pi\theta \times 5} & R_2 \cdot e^{-j2\pi\theta \times 2} & R_3 \cdot e^{-j2\pi\theta \times 3} & R_0 \cdot e^{-j2\pi\theta \times 0} & R_4 \cdot e^{-j2\pi\theta \times 4} & R_1 \cdot e^{-j2\pi\theta \times 1} \\ R_1 \cdot e^{-j2\pi\theta \times 1} & R_{-2} \cdot e^{-j2\pi\theta \times (-2)} & R_{-1} \cdot e^{-j2\pi\theta \times (-1)} & R_{-4} \cdot e^{-j2\pi\theta \times (-4)} & R_0 \cdot e^{-j2\pi\theta \times 0} & R_{-3} \cdot e^{-j2\pi\theta \times (-3)} \\ R_4 \cdot e^{-j2\pi\theta \times 4} & R_1 \cdot e^{-j2\pi\theta \times 1} & R_2 \cdot e^{-j2\pi\theta \times 2} & R_{-1} \cdot e^{-j2\pi\theta \times (-1)} & R_3 \cdot e^{-j2\pi\theta \times 3} & R_0 \cdot e^{-j2\pi\theta \times 0} \end{bmatrix} \quad (16)$$

In step 427, the channel estimation apparatus defines MMSE channel estimation weight tables (W) of 'k' number quantized about a speed and a CINR, based on the determined time offset compensated frequency cross-correlation value "$R_{dp,f,compensated}$" frequency auto-correlation value "$R_{pp,f,compensated}$", and the determined frequency offset compensated time cross-correlation value '$R_{dp,t,compensated}$' and time auto-correlation value "$R_{pp,t,compensated}$".

$$\begin{aligned} W(k) &= R_{dp}(k) \cdot \left(R_{PP}(k) + \frac{1}{CINR(k)}I\right)^{-1} \\ &= (R_{dp,f,compensated} \otimes R_{dp,t,compensated}(k)) \cdot \\ &\quad \left((R_{pp,f,compensated} \otimes R_{pp,t,compensated}(k)) + \frac{1}{CINR(k)}I\right)^{-1} \end{aligned} \quad (17)$$

Here, the matrix operator "⊗" performs multiplication by element for given two matrixes.

However, when it is determined in step 401 that the speed estimation is impossible, in step 419, the channel estimation apparatus considers pilot LS average values and determines a frequency cross-correlation value "$R_{dp,f}$" and frequency auto-correlation value "$R_{pp,f}$". For instance, in the case in which speed estimation is impossible in an IEEE 16m uplink pilot pattern of a 1 Tx stream, a frequency cross-correlation value "$R_{dp,f}$" and frequency auto-correlation value "$R_{pp,f}$" considering pilot LS average values can be determined as in Equations (18) and (19) below.

$$R_{dp,f} = \begin{matrix} P_{Avg,1} & P_{Avg,2} & P_{Avg,3} \\ \begin{bmatrix} R_0 & R_8^* & R_{16}^* \\ \vdots & \vdots & \vdots \\ R_8 & R_0 & R_8^* \\ \vdots & \vdots & \vdots \\ R_{16} & R_8 & R_0 \\ R_{17} & R_9 & R_1 \end{bmatrix} \end{matrix}, \quad (18)$$

wherein $R_k = \sum_n (\sigma_n^2 * e^{-j2\pi k \Delta f \tau_n})$ $$R_{pp,f} = \begin{matrix} P_{Avg,1} & P_{Avg,2} & P_{Avg,3} \\ \begin{bmatrix} R_0 & R_8^* & R_{16}^* \\ R_8 & R_0 & R_8^* \\ R_{16} & R_8 & R_0 \end{bmatrix} \end{matrix} \quad (19)$$

Here, a frequency correlation value "$R_f$" can be determined by using the formula $$\sum_n (\sigma_n^2 \cdot e^{-j2\pi k \Delta f \tau_n}).$$

The required parameters (i.e., $\sigma_n^2$, $\tau_n$) use the predefined channel profile. Equation (18) above represents frequency cross-correlation values with eighteen subcarrier tones regarding each of the pilot LS average values ($P_{Avg,1}$, $P_{Avg,2}$, $P_{Avg,3}$), and Equation (19) represents frequency auto-correlation values with three pilot tones regarding each of the pilot LS average values ($P_{Avg,1}$, $P_{Avg,2}$, $P_{Avg,3}$).

In step 421, the channel estimation apparatus determines a phase bias unit (θ) for time offset compensation. For instance, in the case in which speed estimation is impossible in an IEEE 16m uplink pilot pattern of a 1 Tx stream, a phase bias unit (θ) for time offset compensation can be determined as in Equation (20) below.

$$R_8 = a + bi, \quad (20)$$

$$\text{phase bias}(\theta) = \frac{\tan^{-1}\left(\frac{b}{a}\right)}{8}$$

In detail, in the case in which a correlation value ($R_8$) of a case that eight subcarrier tones exist between two pilots is defined as a general expression of a+bi, a phase bias unit (θ) for time offset compensation can be determined as a changed phase of one subcarrier tone by dividing a changed phase between the eight subcarrier tones by "8".

In step 423, the channel estimation apparatus removes the determined phase bias unit (θ) from the determined frequency cross-correlation value "$R_{dp,f}$" and frequency auto-correlation value "$R_{pp,f}$", and determines a time offset compensated frequency cross-correlation value "$R_{dp,f,compensated}$" and frequency auto-correlation value "$R_{pp,f,compensated}$". For example, if the determined phase bias unit (θ) of Equation 20 above is removed from the determined frequency cross-correlation value "$R_{dp,f}$" and frequency auto-correlation value "$R_{pp,f}$" of Equations (7) and (8) above, a time offset compensated frequency cross-correlation value "$R_{dp,f,compensated}$" and frequency auto-correlation value "$R_{pp,f,compensated}$" can be determined as in Equations (21) and (22) below.

$$R_{dp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ \vdots & \vdots & \vdots \\ R_8 \cdot e^{-j2\pi\theta \times 8} & R_0 \cdot e^{-j2\pi\theta \times 0} & (R_8 \cdot e^{-j2\pi\theta \times 8})^* \\ \vdots & \vdots & \vdots \\ R_{16} \cdot e^{-j2\pi\theta \times 16} & R_8 \cdot e^{-j2\pi\theta \times 8} & R_0 \cdot e^{-j2\pi\theta \times 0} \\ R_{17} \cdot e^{-j2\pi\theta \times 17} & R_9 \cdot e^{-j2\pi\theta \times 9} & R_1 \cdot e^{-j2\pi\theta \times 1} \end{bmatrix} \quad (21)$$

$$R_{pp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ R_8 \cdot e^{-j2\pi\theta \times 8} & R_0 \cdot e^{-j2\pi\theta \times 0} & (R_8 \cdot e^{-j2\pi\theta \times 8})^* \\ R_{16} \cdot e^{-j2\pi\theta \times 16} & R_8 \cdot e^{-j2\pi\theta \times 8} & R_0 \cdot e^{-j2\pi\theta \times 0} \end{bmatrix} \quad (22)$$

In step 425, the channel estimation apparatus determines "1" as a frequency offset compensated time cross-correlation value "$R_{dp,t,compensated}$" and time auto-correlation value "$R_{pp,t,compensated}$", and proceeds to step 427 and performs the subsequent steps. That is, in the case in which speed estimation is impossible, the channel estimation apparatus assumes a static channel, setting the frequency offset compensated time correlation values to "1" as in Equation (23) below.

$$R_{dp,t,compensated} = 1$$

$$R_{pp,t,compensated} = 1 \quad (23)$$

The channel estimation apparatus then terminates the algorithm according to the embodiment of the present invention.

Figure 7:
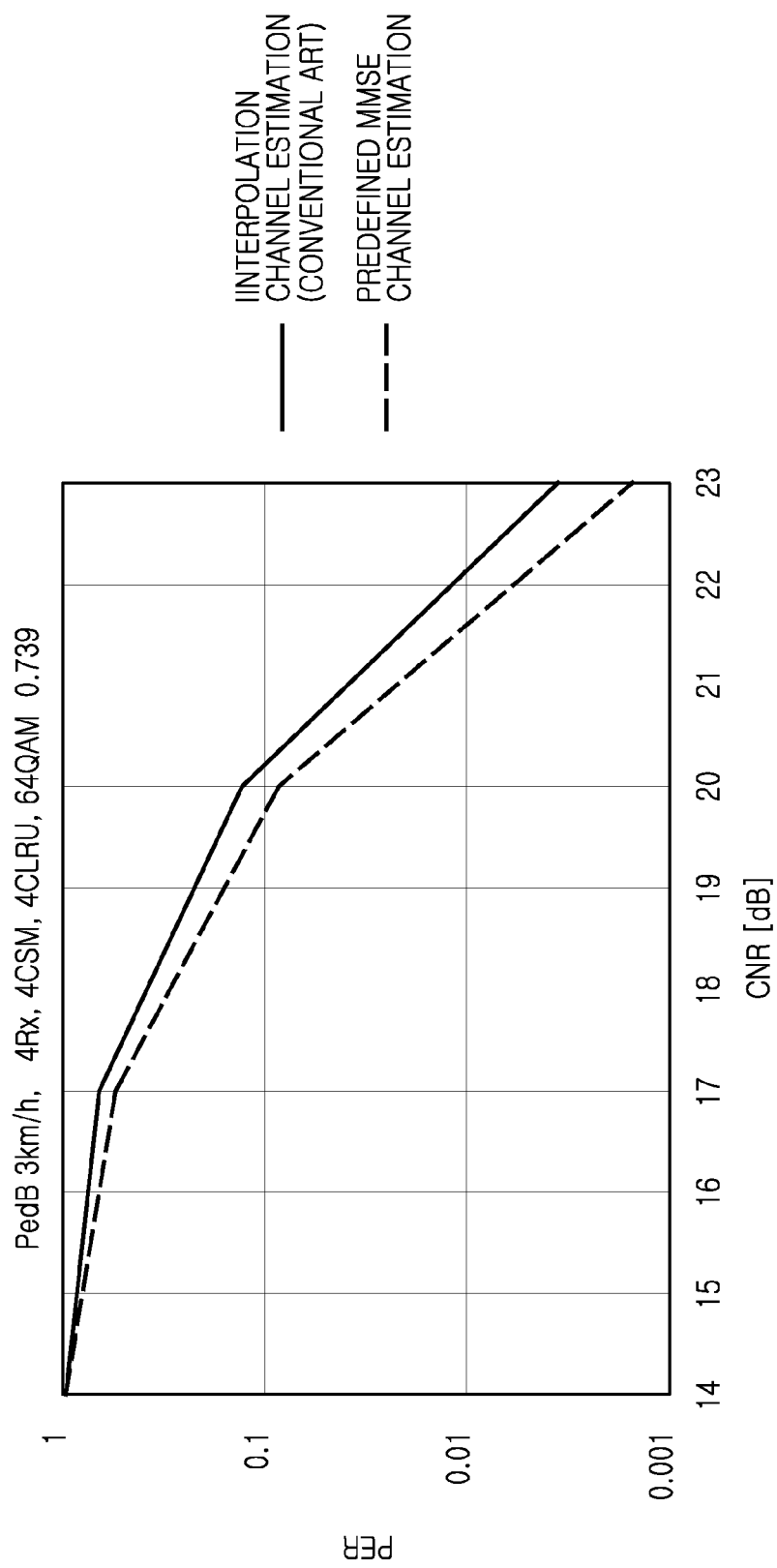
FIG. 7 is a graph illustrating a comparison of link performance between an MMSE channel estimation scheme and a linear interpolation channel estimation scheme according to the present invention.

FIG. 7 is a graph illustrating a comparison of link performance between an MMSE channel estimation scheme and a linear interpolation channel estimation scheme according to the present invention.

Referring to FIG. 7, it can be identified that, when an improved MMSE channel estimation scheme considering frequency offset and time offset compensation proposed in the present invention is applied, better performance is achieved compared to a conventional linear interpolation channel estimation scheme.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A channel estimation method in a wireless communication system, the method comprising:
    determining whether speed estimation is possible;
    if the speed estimation is possible, estimating the speed and a Carrier to Interference-and-Noise Ratio (CINR), selecting a weight table from a plurality of weight tables, based on the estimated speed and CINR, and estimating a data channel, based on a pilot channel estimation value and the selected weight table; and
    if the speed estimation is impossible, determining a pilot channel average value on a time domain, estimating the CINR, selecting a weight table from the plurality of weight tables, based on the estimated CINR, and estimating the data channel, based on the determined pilot channel average value and the selected weight table.

2. The method of claim 1, wherein estimating the pilot channel comprises:
estimating the pilot channel in a Least Square (LS) scheme to acquire the pilot channel estimation value.

3. The method of claim 1, further comprising:
considering all pilot channel values and determining a frequency cross-correlation value and a frequency auto-correlation value, if the speed estimation is possible;
determining a first phase bias unit for time offset compensation;
removing the determined first phase bias unit from the determined frequency cross-correlation value and frequency auto-correlation value, and determining a time offset compensated frequency cross-correlation value and a time offset compensated frequency auto-correlation value;
considering all the pilot channel values and determining a time cross-correlation value and a time auto-correlation value;
determining a second phase bias unit for frequency offset compensation;
removing the determined second phase bias unit from the determined time cross-correlation value and the time auto-correlation value, and determining a frequency offset compensated time cross-correlation value and a frequency offset compensated time auto-correlation value; and
generating the plurality of weight tables quantized about the speed and the CINR, based on the determined time offset compensated frequency cross-correlation value, the determined time offset compensated frequency auto-correlation value, the determined frequency offset compensated time cross-correlation value, and the determined frequency offset compensated time auto-correlation value.

4. The method of claim 3, wherein the first phase bias unit for the time offset compensation is defined by:

$$R_n = a + bi,$$

$$\text{phase bias}(\theta) = \frac{\tan^{-1}\left(\frac{b}{a}\right)}{n}$$

where,
θ is the first phase bias unit for time offset compensation, and
n is the number of subcarrier tones.

5. The method of claim 3, wherein the time offset compensated frequency cross-correlation value and the time offset compensated frequency auto-correlation value are defined by:

$$R_{dp,f,compensated} = \begin{bmatrix} R_0 \cdot e^{-j2\pi\theta\times 0} & (R_8 \cdot e^{-j2\pi\theta\times 8})^* & (R_{16} \cdot e^{-j2\pi\theta\times 16})^* \\ \vdots & \vdots & \vdots \\ R_8 \cdot e^{-j2\pi\theta\times 8} & R_0 \cdot e^{-j2\pi\theta\times 0} & (R_8 \cdot e^{-j2\pi\theta\times 8})^* \\ \vdots & \vdots & \vdots \\ R_{16} \cdot e^{-j2\pi\theta\times 16} & R_8 \cdot e^{-j2\pi\theta\times 8} & R_0 \cdot e^{-j2\pi\theta\times 0} \\ R_{17} \cdot e^{-j2\pi\theta\times 17} & R_9 \cdot e^{-j2\pi\theta\times 9} & R_1 \cdot e^{-j2\pi\theta\times 1} \end{bmatrix}$$

-continued $$R_{pp,f,compensated} = \begin{bmatrix} R_0 \cdot e^{-j2\pi\theta\times 0} & (R_8 \cdot e^{-j2\pi\theta\times 8})^* & (R_{16} \cdot e^{-j2\pi\theta\times 16})^* \\ R_8 \cdot e^{-j2\pi\theta\times 8} & R_0 \cdot e^{-j2\pi\theta\times 0} & (R_8 \cdot e^{-j2\pi\theta\times 8})^* \\ R_{16} \cdot e^{-j2\pi\theta\times 16} & R_8 \cdot e^{-j2\pi\theta\times 8} & R_0 \cdot e^{-j2\pi\theta\times 0} \end{bmatrix}$$

where,
$R_{dp,f,compensated}$ is the time offset compensated frequency cross-correlation value, and
$R_{pp,f,compensated}$ is the time offset compensated frequency auto-correlation value.

6. The method of claim 1, further comprising:
considering pilot channel average values determined by averaging pilot channel estimation values on a time domain and determining a frequency cross-correlation value and a frequency auto-correlation value, if the speed estimation is impossible;
determining a third phase bias unit for time offset compensation; and
removing the determined third phase bias unit from the determined frequency cross-correlation value and the determined frequency auto-correlation value, and determining a time offset compensated frequency cross-correlation value and a time offset compensated frequency auto-correlation value.

7. The method of claim 6, further comprising:
determining "1" as a frequency offset compensated time cross-correlation value and a frequency offset compensated time auto-correlation value; and
generating the plurality of weight tables quantized about a CINR, based on the determined time offset compensated frequency cross-correlation value, the determined time offset compensated frequency auto-correlation value, the determined frequency offset compensated time cross-correlation value, and the determined frequency offset compensated time auto-correlation value.

8. The method of claim 6, wherein the third phase bias unit for the time offset compensation is defined by:

$$R_n = a + bi,$$

$$\text{phase bias}(\theta) = \frac{\tan^{-1}\left(\frac{b}{a}\right)}{n}$$

where,
θ is the third phase bias unit for time offset compensation, and
n is the number of subcarrier tones.

9. The method of claim 6, wherein the time offset compensated frequency cross-correlation value and the time offset compensated frequency auto-correlation value are defined by:

$$R_{dp,f,compensated} = \begin{bmatrix} R_0 \cdot e^{-j2\pi\theta\times 0} & (R_8 \cdot e^{-j2\pi\theta\times 8})^* & (R_{16} \cdot e^{-j2\pi\theta\times 16})^* \\ \vdots & \vdots & \vdots \\ R_8 \cdot e^{-j2\pi\theta\times 8} & R_0 \cdot e^{-j2\pi\theta\times 0} & (R_8 \cdot e^{-j2\pi\theta\times 8})^* \\ \vdots & \vdots & \vdots \\ R_{16} \cdot e^{-j2\pi\theta\times 16} & R_8 \cdot e^{-j2\pi\theta\times 8} & R_0 \cdot e^{-j2\pi\theta\times 0} \\ R_{17} \cdot e^{-j2\pi\theta\times 17} & R_9 \cdot e^{-j2\pi\theta\times 9} & R_1 \cdot e^{-j2\pi\theta\times 1} \end{bmatrix}$$

$$R_{pp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ R_8 \cdot e^{-j2\pi\theta \times 8} & R_0 \cdot e^{-j2\pi\theta \times 0} & (R_8 \cdot e^{-j2\pi\theta \times 8})^* \\ R_{16} \cdot e^{-j2\pi\theta \times 16} & R_8 \cdot e^{-j2\pi\theta \times 8} & R_0 \cdot e^{-j2\pi\theta \times 0} \end{bmatrix}$$

where, $R_{dp,f,compensated}$ is the time offset compensated frequency cross-correlation value, and $R_{pp,f,compensated}$ is the time offset compensated frequency auto-correlation value.

10. The method of claim 1, wherein the weight table is defined by:

$$W = (R_{dp,f,compensated} \otimes R_{dp,t,compensated}) \cdot \left( (R_{pp,f,compensated} \otimes R_{pp,t,compensated}) + \frac{1}{CINR} I \right)^{-1}$$

where,

W is the weight table, $\otimes$ is a matrix operator performing multiplication by element for given two matrixes, $R_{dp,f,compensated}$ is a time offset compensated frequency cross-correlation value, $R_{pp,f,compensated}$: is a time offset compensated frequency auto-correlation value, $R_{dp,t,compensated}$ is a frequency offset compensated time cross-correlation value; and $R_{pp,t,compensated}$ is a frequency offset compensated time auto-correlation value.

11. The method of claim 1, wherein estimating the data channel comprises estimating the data channel by multiplying the pilot channel estimation value and values of the selected weight table in a Minimum Mean Square Error (MMSE) scheme.

12. A channel estimation apparatus in a wireless communication system, the apparatus comprising:

a first estimator configured to estimate a pilot channel;

a second estimator configured to estimate a speed and a Carrier to Interference-and-Noise Ratio (CINR);

a pilot time domain averager configured to determine an average value of the pilot channel estimation value on a time domain;

a selector configured to select a weight table from a plurality of weight tables, based on at least one of the estimated speed and CINR; and a third estimator configured to estimate a data channel, based on a pilot channel estimation value and the selected weight table, if the speed estimation is possible, and to estimate the data channel, based on the determined average value of the pilot channel estimation and the selected weight table, if the speed estimation is impossible.

13. The apparatus of claim 12, wherein the first estimator is configured to estimate the pilot channel in a Least Square (LS) scheme to acquire the pilot channel estimation value.

14. The apparatus of claim 12, further comprising a weight table generator, which is configured to:

consider all pilot channel values and determine a frequency cross-correlation value and a frequency auto-correlation value, if the speed estimation is possible;

determine a first phase bias unit for time offset compensation;

remove the determined first phase bias unit from the determined frequency cross-correlation value and frequency auto-correlation value, and determine a time offset compensated frequency cross-correlation value and a time offset compensated frequency auto-correlation value;

consider all the pilot channel values and determine a time cross-correlation value and a time auto-correlation value;

determine a second phase bias unit for frequency offset compensation, remove the determined second phase bias unit from the determined time cross-correlation value and time auto-correlation value, and determine a frequency offset compensated time cross-correlation value and a frequency offset compensated time auto-correlation value, and generate the plurality of weight tables quantized about the speed and the CINR, based on the determined time offset compensated frequency cross-correlation value, the determined time offset compensated frequency auto-correlation value, the determined frequency offset compensated time cross-correlation value, and the determined frequency offset compensated time auto-correlation value.

15. The apparatus of claim 14, wherein the first phase bias unit for the time offset compensation is defined by:

$$R_n = a + bi,$$

$$\text{phase bias}(\theta) = \frac{\tan^{-1}\left(\frac{b}{a}\right)}{n}$$

where, $\theta$ is the first phase bias unit for time offset compensation, and n is the number of subcarrier tones.

16. The apparatus of claim 14, wherein the time offset compensated frequency cross-correlation value and the time offset compensated frequency auto-correlation value are defined by:

$$R_{dp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ \vdots & \vdots & \vdots \\ R_8 \cdot e^{-j2\pi\theta \times 8} & R_0 \cdot e^{-j2\pi\theta \times 0} & (R_8 \cdot e^{-j2\pi\theta \times 8})^* \\ \vdots & \vdots & \vdots \\ R_{16} \cdot e^{-j2\pi\theta \times 16} & R_8 \cdot e^{-j2\pi\theta \times 8} & R_0 \cdot e^{-j2\pi\theta \times 0} \\ R_{17} \cdot e^{-j2\pi\theta \times 17} & R_9 \cdot e^{-j2\pi\theta \times 9} & R_1 \cdot e^{-j2\pi\theta \times 1} \end{bmatrix}$$

$$R_{pp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ R_8 \cdot e^{-j2\pi\theta \times 8} & R_0 \cdot e^{-j2\pi\theta \times 0} & (R_8 \cdot e^{-j2\pi\theta \times 8})^* \\ R_{16} \cdot e^{-j2\pi\theta \times 16} & R_8 \cdot e^{-j2\pi\theta \times 8} & R_0 \cdot e^{-j2\pi\theta \times 0} \end{bmatrix}$$

where, $R_{dp,f,compensated}$ is the time offset compensated frequency cross-correlation value, and $R_{pp,f,compensated}$ is the time offset compensated frequency auto-correlation value.

17. The apparatus of claim 12, further comprising a weight table generator, which configured to:

if the speed estimation is impossible, consider pilot channel average values determined by averaging pilot channel estimation values on a time domain and determine a frequency cross-correlation value and frequency auto-correlation value, determine a third phase bias unit for time offset compensation, and removes the determined third phase bias unit from the determined frequency cross-correlation value and frequency auto-correlation value, and determine a time offset compensated frequency cross-correlation value and a time offset compensated frequency auto-correlation value.

18. The apparatus of claim 17, wherein the weight table generator is further configured to determine "1" as a frequency offset compensated time cross-correlation value and a frequency offset compensated time auto-correlation value, and generate the plurality of weight tables quantized about the CINR, based on the determined time offset compensated frequency cross-correlation value, the determined time offset compensated frequency auto-correlation value, the determined frequency offset compensated time cross-correlation value, and the determined frequency offset compensated time auto-correlation value.

19. The apparatus of claim 17, wherein the third phase bias unit for the time offset compensation is defined by:

$$R_n = a + bi,$$

$$\text{phase bias}(\theta) = \frac{\tan^{-1}\left(\frac{b}{a}\right)}{n}$$

where,

θ is the third phase bias unit for time offset compensation, and n is the number of subcarrier tones.

20. The apparatus of claim 17, wherein the time offset compensated frequency cross-correlation value and the time offset compensated frequency auto-correlation value are defined by:

$$R_{dp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ \vdots & \vdots & \vdots \\ R_8 \cdot e^{-j2\pi\theta \times 8} & R_0 \cdot e^{-j2\pi\theta \times 0} & (R_8 \cdot e^{-j2\pi\theta \times 8})^* \\ \vdots & \vdots & \vdots \\ R_{16} \cdot e^{-j2\pi\theta \times 16} & R_8 \cdot e^{-j2\pi\theta \times 8} & R_0 \cdot e^{-j2\pi\theta \times 0} \\ R_{17} \cdot e^{-j2\pi\theta \times 17} & R_9 \cdot e^{-j2\pi\theta \times 9} & R_1 \cdot e^{-j2\pi\theta \times 1} \end{bmatrix}$$

$$R_{pp,f,compensated} = \begin{bmatrix} R_0 \cdot e^{-j2\pi\theta \times 0} & (R_8 \cdot e^{-j2\pi\theta \times 8})^* & (R_{16} \cdot e^{-j2\pi\theta \times 16})^* \\ R_8 \cdot e^{-j2\pi\theta \times 8} & R_0 \cdot e^{-j2\pi\theta \times 0} & (R_8 \cdot e^{-j2\pi\theta \times 8})^* \\ R_{16} \cdot e^{-j2\pi\theta \times 16} & R_8 \cdot e^{-j2\pi\theta \times 8} & R_0 \cdot e^{-j2\pi\theta \times 0} \end{bmatrix}$$

where, $R_{dp,f,compensated}$ is the time offset compensated frequency cross-correlation value, and $R_{pp,f,compensated}$ is the time offset compensated frequency auto-correlation value.

21. The apparatus of claim 12, wherein each of the plurality of weight tables is defined by:

$$W = (R_{dp,f,compensated} \otimes R_{dp,t,compensated}) \cdot \left((R_{pp,f,compensated} \otimes R_{pp,t,compensated}) + \frac{1}{CINR}I\right)^{-1}$$

where,

W is the weight table,

⊗ is the matrix operator performing multiplication by element for given two matrixes, $R_{dp,f,compensated}$ is a time offset compensated frequency cross-correlation value, $R_{pp,f,compensated}$ a time offset compensated frequency auto-correlation value, $R_{dp,t,compensated}$ is a frequency offset compensated time cross-correlation value; and $R_{pp,t,compensated}$ is a frequency offset compensated time auto-correlation value.

22. The apparatus of claim 12, wherein the third estimator is configured to estimate the data channel by multiplying the pilot channel estimation value and values of the selected weight table using a Minimum Mean Square Error (MMSE) scheme.

* * * * *